Feb. 14, 1933.  L. E. JONES  1,897,431
CONVEYER
Filed Dec. 8, 1930
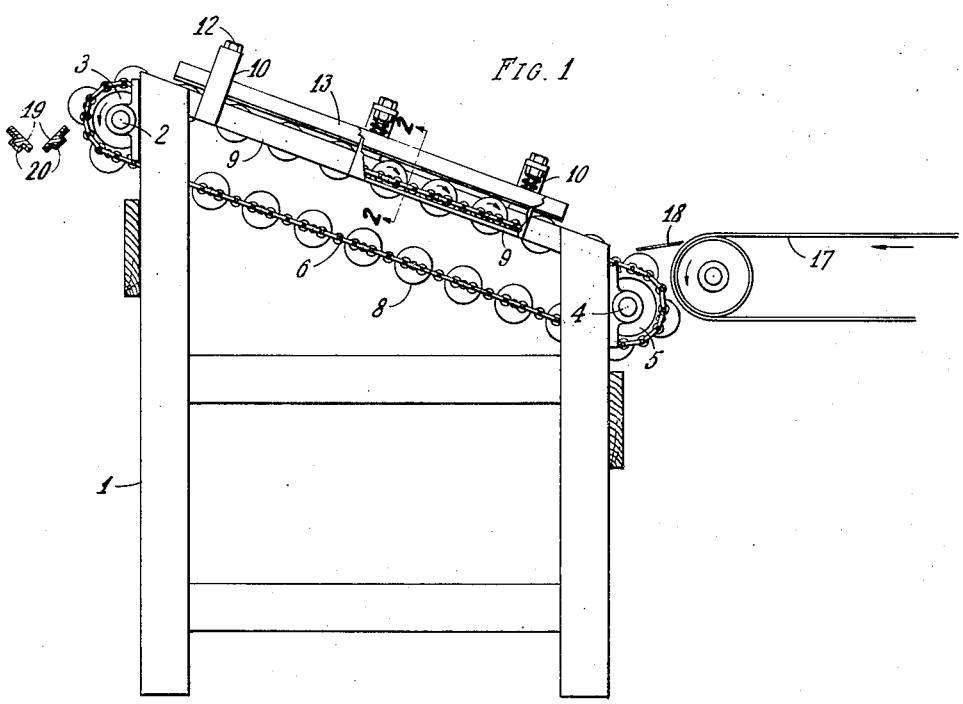
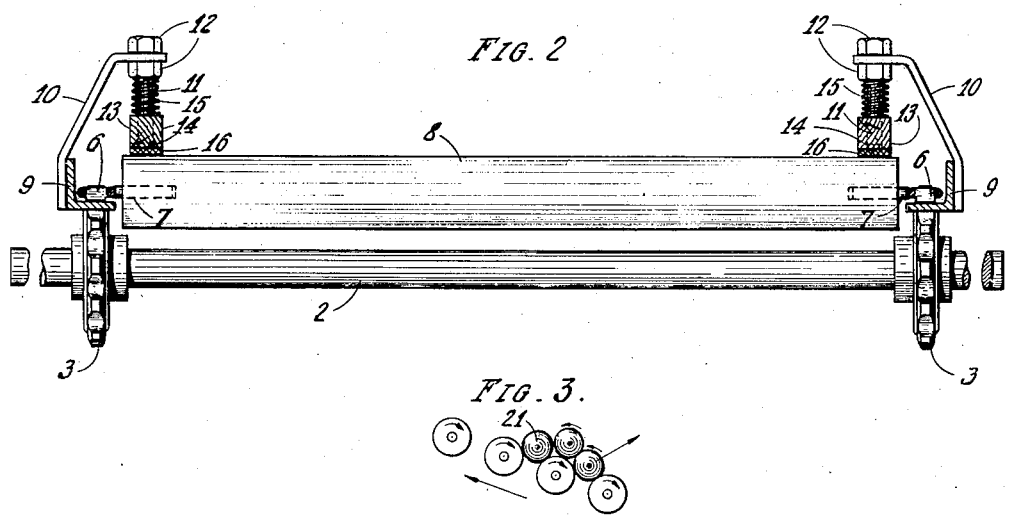
INVENTOR.
Lloyd. E. Jones.
BY Philip A. Minnis
ATTORNEYS.

Patented Feb. 14, 1933

1,897,431

UNITED STATES PATENT OFFICE

LLOYD E. JONES, OF SANTA MONICA, CALIFORNIA, ASSIGNOR TO FOOD MACHINERY CORPORATION, OF SAN JOSE, CALIFORNIA, A CORPORATION OF DELAWARE

CONVEYER

Application filed December 8, 1930. Serial No. 500,888.

This invention relates to conveying and elevating apparatus such as may be used in packing houses for conveying and elevating fruit, vegetables and other similar articles to a suitable point of delivery where they may be delivered to a receiving device such as for example, a grading apparatus or the like, and provides a simple and inexpensive construction adapted to discharge fruit or other articles in single file. Although it will be apparent as the description proceeds that apparatus embodying the invention is susceptible of a variety of applications and may be used in connection with the handling of articles other than fruit, for the sake of convenience I shall describe its operation when used to supply citrus fruit to grading apparatus.

One common type of machine for grading fruit according to size, particularly citrus fruit, comprises a pair of endless travelling belts, arranged in trough-like relation, to serve to support and carry the fruit until the belts have diverged sufficiently to allow each piece to be released therefrom and deposited in that group to which it belongs. It will be apparent that in order to secure accurate sizing, the fruit must be placed in the belts in single file, since, if pieces of fruit are placed in the belts on top of each other, the fruit on top will not be properly sized if it is the smaller, for it cannot be released until that fruit underneath it is released, and when this occurs, the smaller fruit is deposited with the larger.

For feeding fruit to sizing apparatus of the type described, attempts have been made to utilize endless conveyers of the type comprising transversely arranged spaced conveyer rollers between which the fruit rests. The main difficulty encountered in the use of this type of conveyer has been that as the fruit is fed thereto, the pieces are not only deposited in the depressions between the rollers but some pieces rest on top of the rollers between the lines of fruit in the depressions. The consequence is that the fruit is so close together that it cannot be deposited in the sizing belts in single file so that inaccurate sizing results and the only alternative is to manually remove from the conveyer that fruit resting on top of the rollers.

It is the principal object of this invention to provide a conveyer of the transverse roller type to which fruit can be fed in the customary manner and which shall be adapted to automatically rearrange the fruit thereon so that all the fruit will lie in the depressions between the rollers and none upon the rollers between the groups of fruit in the depressions, thus eliminating the necessity of manual rearrangement heretofore found necessary in order to secure proper results.

More specifically, it is an object to construct a conveyer of the endless type, composed of a plurality of transversely arranged rollers which shall be mounted on an incline and in which provision is made for revolving the rollers of the working run during the operation of the conveyer in a direction opposite to the direction of travel of the conveyer.

With the above mentioned and other objects in view, the invention consists in the novel construction and combination of parts hereinafter described, illustrated in the accompanying drawing and set forth in the claims hereto appended, it being understood that various changes in form, proportions, size and minor details of construction within the scope of the claims may be resorted to without departing from the spirit or sacrificing any of the advantages of the invention.

As illustrative of a preferred form of the invention, reference may be had to the accompanying drawing in which;

Figure 1 is a side elevation of a conveyer constructed according to my invention, some of the parts being broken away to better illustrate certain details of construction.

Figure 2 is a sectional view taken along the line 2—2 of Figure 1 and drawn to a larger scale.

Figure 3 is a diagrammatic illustration showing the manner of operation of the conveyer embodying my invention.

Like reference characters refer to similar parts throughout the several views. Numeral 1 refers to a suitable frame serving to support at one end a rotatable shaft 2 to which power may be supplied in any suitable manner so as to cause it to rotate in the direction indicated by the arrow and which carries a pair of spaced sprockets 3.

A similar shaft 4 is supported at the opposite end of the frame at a lower elevation and carries the sprockets 5. Endless carrier chains 6 pass around sprockets 3 and 5 and are provided at spaced intervals with projecting pins 7 upon which are rotatably mounted the transversely disposed conveying rollers 8. These rollers are slightly spaced from each other so that they may all be rotated in the same direction, the width of the space between the rollers being selected according to the size of articles to be handled.

On each side of the apparatus, extending longitudinally thereof, is mounted an angular rail 9 which forms a supporting track for the chains 6, thus preventing sagging of the conveying rollers in the working run. At spaced intervals along the rails 9, upwardly projecting supporting brackets 10 are securely fixed thereto, said brackets having their upper ends bent over as shown, so as to form supports for pins 11 passing therethrough and securely fixed thereto by the nuts 12. Friction strips 13 are provided with bores 14 which receive the ends of the pins 11, this construction serving to hold the strips in place while at the same time allowing them to slide up and down on the pins. Springs 15 surround the pins and bear against the underneath nuts 12 and the top of the friction strips 13 and operate to maintain the strips in contact with the rollers 8. In the preferred construction I provide the underneath side of the friction strips with a covering of soft rubber 16 or like material to increase the frictional effect and aid in maintaining the bottoms of the strips in contact with all the rollers.

It will now be apparent that the construction just described provides an inclined conveyer composed of a plurality of transversely disposed rotatable supporting rollers, the tops of which are in contact with friction strips adapted to cause the rollers of the working run to rotate in a direction opposite to their path of travel.

Fruit may be fed to the conveyer by means of any suitable feeding device and in the embodiment illustrated, I have shown an endless belt 17 for this purpose, adapted to carry fruit on its upper run toward the roller conveyer and discharge it thereto over the ramp 18. The fruit received by the conveyer is carried upwardly on the rotating rollers and discharged over the upper end into suitable receiving apparatus. In the present instance, I have shown the receiving device as being the gradeway of a diverting belt sizing apparatus, such as heretofore described, of which I have shown only the angularly disposed sizing belts 19 supported by their guides 20. I have not illustrated further details of the sizing apparatus, since they are well known in the art and are unnecessary to an understanding of my invention.

Referring now to Figure 3, the operation of the rollers on fruit supported by them will be described. It will be apparent that pieces of fruit discharged onto the conveyer rollers by the delivery belt 17 may not only rest in the depression between the rollers but also on the tops of the rollers between the pieces in the depressions as shown. If fruit rests in this position as it is discharged over the upper end of the conveyer, it will be seen that it will not be deposited in the sizing belts in single file but that pieces will lie on top of each other so that inaccurate sizing will result.

When, however, the rollers are caused to rotate in a direction opposite to their path of travel, as illustrated in Figure 3, the pieces of fruit 21, resting in the depressions between the rollers will be urged to rotate in the same direction as the pieces resting on top of the rollers. By reason of the inclination of the conveyer, the fruit on top of the rollers will also rest against the fruit in the depression behind it with the result that the oppositely moving surfaces of the contacting fruit tend to retard the rotation of the fruit lying in the depression, whereupon the friction due to the weight of the fruit against the lower roller causes it to be ejected from the depression so that the fruit on top rolls down to take its place. In this manner, by the time the fruit reaches the discharge end of the conveyer, all the pieces are resting in the depressions between the rollers and none on the top of the rollers so that the fruit is discharged in rows in single file.

In practice, it has been found that ordinarily the arrangement of fruit is completed during the early part of its travel so that it is unnecessary for the friction strips to extend over the rollers throughout the entire length of the conveyer. The most suitable length can be determined, however, according to requirements in each individual case, the length of strips and the number of rollers affected thereby will, of course, vary with the size of fruit or other articles being handled, the degree of inclination of the conveyer and the manner in which the fruit or other articles is fed to it.

It will be understood that altho for the purposes of this disclosure I have illustrated and described a conveyer having an inclined working run, my invention contemplates that it may also be mounted horizontally and satisfactory results obtained.

The rate of travel of the conveyer should be regulated according to the speed of the sizing belts so that fruit deposited upon the sizing belts will be carried away from the discharge end of the conveyer before the next group of fruit is delivered thereto. In this way the sizing belts will receive successive groups of fruit, the pieces of fruit in each group being in single file and no fruit will be discharged on top of fruit already discharged.

Having now described my invention in the manner in which the same may be used, what I claim is new and desire to protect by Letters Patent is:

1. An endless conveyer having its working run inclined upwardly towards its discharge end and comprising a series of transversely disposed supporting rollers spaced to support rollable articles between adjacent rollers, means for imparting endless longitudinal travel thereto, and means for imparting rotation to a plurality of adjacent rollers in the working run of the conveyer in a direction opposite to their path of travel.

2. An endless conveyer having its working run inclined upwardly towards its discharge end and comprising a series of transversely disposed supporting rollers spaced to support rollable articles between adjacent rollers, endless carriers connecting the rollers for imparting endless longitudinal travel thereto, and means for imparting rotation to a plurality of adjacent rollers in the working run of the conveyer in a direction opposite to their path of travel during longitudinal movement thereof.

3. An endless conveyer having its working run inclined upwardly towards its discharge end, and comprising a pair of endless chains and means for operating same, a series of transversely disposed spaced supporting rollers forming the sole support for rollable articles resting therebetween and having their ends rotatably mounted on pins projecting from said chains, and means for imparting rotation to a plurality of adjacent rollers in the working run of the conveyer, in a direction opposite to their path of travel.

4. An endless conveyer having its working run inclined upwardly towards its discharge end and comprising a series of transversely disposed supporting rollers so spaced as to prevent the passage of conveyed rollable articles between adjacent rollers, means for imparting endless longitudinal travel thereto and friction strips disposed above the working run of the conveyer and adapted to contact with the upper faces of a plurality of supporting rollers in said run.

5. An endless conveyer having its working run inclined upwardly towards its discharge end, and comprising a series of transversely disposed supporting rollers spaced to support rollable articles between adjacent rollers, means for imparting endless longitudinal travel thereto, and resiliently mounted friction strips disposed above the working run of the conveyer and adapted to contact with the upper faces of a plurality of adjacent supporting rollers in said run.

6. An endless conveyer having its working run inclined upwardly towards its discharge end and comprising a series of transversely disposed supporting rollers spaced to support rollable articles between adjacent rollers, endless carriers connecting the rollers for imparting endless longitudinal travel thereto and friction strips disposed above the working run of the conveyer and adapted to contact with the upper faces of a plurality of adjacent supporting rollers in said run.

7. An endless conveyer having its working run inclined upwardly towards its discharge end and comprising a series of transversely disposed spaced supporting rollers forming the sole support for articles resting therebetween, endless carriers connecting the rollers for imparting endless longitudinal travel thereto and resiliently mounted friction strips disposed above the working run of the conveyer and adapted to contact with the upper faces of a plurality of adjacent supporting rollers in said run.

8. In combination with a single file receiving means, means for feeding articles thereto, comprising an endless conveyer having its working run inclined upwardly towards its discharge end and including a series of transversely disposed supporting rollers spaced to support rollable articles between adjacent rollers, means for imparting endless longitudinal travel thereto and means for imparting rotation to a plurality of adjacent rollers in the working run of the conveyer in a direction opposite to their path of travel.

9. In combination with a single file receiving means, means for feeding articles thereto, comprising an endless conveyer having its working run inclined upwardly towards its discharge end and comprising a series of transversely disposed supporting rollers so spaced as to prevent the passage of conveyed rollable articles between adjacent rollers, means for imparting endless longitudinal travel thereto and friction strips disposed above the working run of the conveyer, and adapted to contact with the upper faces of a plurality of supporting rollers in said run.

10. In combination with a pair of longitudinally diverging sizing elements, means for feeding articles thereto, comprising an endless conveyer having its working run inclined upwardly towards its discharge end and including a series of transversely disposed supporting rollers spaced to support rollable articles between adjacent rollers, means for imparting endless longitudinal travel thereto and means for imparting rotation to a plurality of adjacent rollers in the working run of the conveyer, in a direction opposite to their path of travel.

11. In combination with a pair of longitudinally diverging sizing elements, means for feeding articles thereto, comprising an endless conveyer having its working run inclined upwardly towards its discharge end and comprising a series of transversely disposed spaced supporting rollers forming the sole support for rollable articles resting therebetween, means for imparting endless longitudinal travel thereto, and friction strips disposed above the working run of the conveyer and adapted to contact with the upper faces of a plurality of supporting rollers in said run.

Signed at Los Angeles, Calif., this 13th day November, 1930.

LLOYD E. JONES.